D. B. Woodward.

Sheet 1
2 Sheets

Horse Rake.

No 2993

Reissued Jun. 16, 1868.

Witnesses

Jas H Naylor
Henry Davis

Inventor Davis. B. Woodward

D. B. Woodward.

Sheet 2
(2 Sheets

Horse Rake.

No 2993 Reissued Jun. 16, 1868.

Inventor Davis. B. Woodward

Witnesses Jas H Hughes
Henry Davis

UNITED STATES PATENT OFFICE.

HORACE R. HAWKINS, OF AKRON, OHIO, ASSIGNEE OF DAVIS B. WOODWARD.

IMPROVEMENT IN HORSE-RAKES.

Specification forming part of Letters Patent No. 31,507, dated February 19, 1861; reissue No. 2,993, dated June 16, 1868.

*To all whom it may concern:*

Be it known that I, DAVIS B. WOODWARD, formerly of Ercildoun, in the county of Chester and State of Pennsylvania, but now of Marshallton, in said county and State, have invented certain new and useful Improvements in Horse-Rakes, of which the following is a full, clear, and exact description of the same, reference being had to the accompanying drawings, making a part of this specification, in which—

Figure 2:
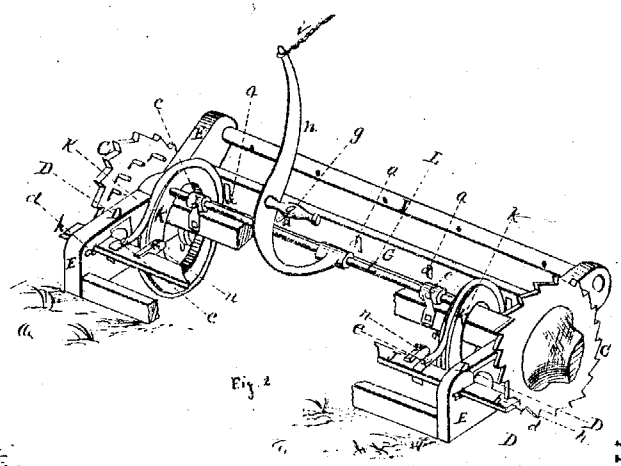
Figure 1:
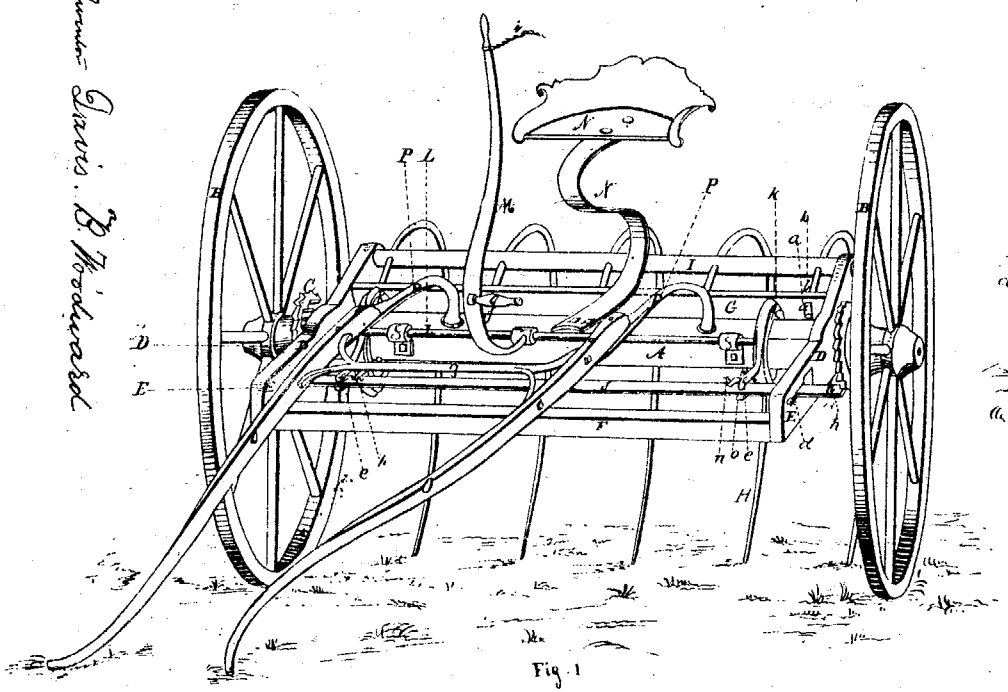
Figure 2:
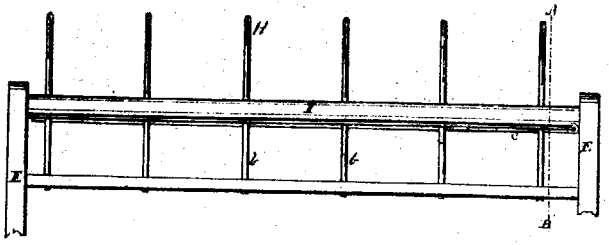
Figure 1:
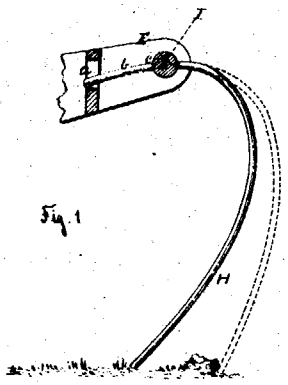

Figure 1, Sheet 1, represents a perspective view of the rake. Fig. 2, Sheet 1, represents a perspective view of a detached part of the rake with a portion of the same broken away. Fig. 1, Sheet 2, represents a section on line A B, Fig. 2, Sheet 2, and Fig. 2, Sheet 2, represents a top or plan view of the rear portion of the rake.

To enable those skilled in the art to which my invention belongs to make and use the same, I will proceed to describe it more in detail.

In the drawings, Sheet 1, the axle A is supported by the wheels B B, the ends of the axle being turned off to form proper journals for the wheels to turn upon. A ratchet-wheel, C, is attached to the inner ends of the hubs of the wheels B B, and the axle A is turned off at each end, so as to form suitable bearings for a rocking frame, D, which is mounted upon said axle between the ratchet-wheels C C, as shown in the drawings. The end pieces, E, extend forward and back of the axle A, being united in front by the cross-bar F, and in the rear by cross-bar G. The cross-bar G has vertical slots *a* cut or formed in it to receive the projecting or extended ends *b* of the curved rake-teeth H, which are supported and have their main bearings in the cross piece or bar I, the ends of which are connected to and are supported in the rear elevated ends of the end pieces, E E, of the rocking frame D. The upper parts of the rake-teeth H are passed through holes in the cross-piece I, and they may be secured from working out and from turning over laterally by passing a small wire or rod, *c*, through holes made in the teeth just forward of the cross-piece I, as shown in Figs. 1 and 2, Sheet 2, while the extended spring ends *b* of the rake-teeth project or extend forward and pass into the slots *a*, in which they can play up and down, and also move longitudinally, when necessary, to enable the lower ends of the teeth to conform to the inequalities of the ground, as will be hereinafter explained.

If found necessary and desirable, weights may be attached to the rear of the rocking frame D.

Slots *d* are made in the front of the end pieces, E E, of the rocking frame D to receive the sliding bar J, to which are fastened the curved rods or straps *e e*, which clasp or pass around the cams or eccentric wheels K K, which encircle the axle A, as shown in the drawings. The cam-wheels K K are fastened to the shaft L, which is supported and turns in the bearings *f f* fastened to the front of the axle A.

A curved lever, M, is fastened upon the shaft L, the upper end passing up on a line in range a little to the right of the driver's seat N, which is fastened to the top of the double browed spring N′, the lower end of which is bolted to the axle A. Lever M has a horizontal projecting arm, *g*, near its lower end.

The thills or shafts O O are fastened to the front ends of the curved irons P P, which are securely fastened to the axle A. The shafts are strengthened by the central brace, Q. By the use of the curved iron supports P P the rear of the shafts O O are elevated sufficiently to permit the front of the rocking frame D to rise without striking when the teeth H fall or rock down to conform to the inequalities of the ground.

The cams or eccentric rings K K are so combined and arranged with the shaft L and sliding bar J that when lever M is moved forward the action of the cam-wheels K K upon the curved rods or straps *e e* will cause the bar J to be drawn back, so that its ends *h h* will enter the notches in the ratchet-wheels C C, thereby performing the functions of pawls. As the ratchet-wheels C C are fastened to the hubs of wheels B B the front F of the rocking frame D is depressed and the rear of the frame, together with the teeth H, elevated by the power of the team whenever the sliding bar J is drawn back far enough to be caught by the ratchet-wheels, as above described.

A rake thus constructed enables the driver upon the seat N with a very slight exertion to employ the power of the team to elevate the teeth H whenever it is desired to discharge the hay therefrom. As soon and whenever the bar J is moved forward so as to be free from the ratchet-wheels the rear end of the rocking frame D falls back into its original position, and the raking operation commences again.

The driver can force lever M forward by applying his foot to arm *g*, or he can operate it with his hand in either direction, to throw bar J in and out of connection with the ratchet-wheels C C. Lever M may also be operated in one direction by an attendant walking behind the rake, by means of a rope or cord, *i*, of sufficient length, attached to lever M.

By combining a ratchet-wheel with each wheel B and arranging the bar J so as to mesh into both ratchet-wheels when the rocking-frame D is to be tilted to discharge the rake the twisting of the rake is avoided, which would result from throwing all the strain upon one or a single wheel, thus rendering the rake more durable, while at the same time rendering the draft upon the horse less severe and more uniform.

By making the rear ends of the side pieces, E E, of the rocking frame D elevated or in shoe form the cross-piece I can be supported at a sufficient height to give a good support to the teeth, both when down raking and when elevated to discharge the hay. The cross-piece I also prevents the hay from working up around the upper ends, *b*, of the teeth H, both when raking and discharging the hay from the same. Again, when the pressure on the teeth is considerable, so much so as to cause one or more of the extended ends, *v*, to strike the bottom of their slotted bearings *a*, the ends *b* then become springs to keep the lower ends of the teeth H down to the ground, thereby insuring good and clean raking, and that, too, without liability of bending or breaking the teeth. Then, again, when the lower ends of the teeth H have passed an obstruction and they fly forward the extended ends *b* can fly up in the slotted bearings *a*, thus relieving the teeth, so as to avoid breaking or bending by the sudden spring of the teeth. The rocking frame D rises and falls at the rear end as the teeth are drawn over the ground, to enable said teeth to conform to the general inequalities of the surface thereof.

In the event of breaking a tooth it can be removed and replaced very easily.

The cross-piece I serves as a fulcrum of the teeth. It has also considerable spring, which eases the teeth very much.

By the use or employment of the wire *c*, which passes through each tooth, the teeth are supported back of their forward or extended ends in such a manner as not to interfere with the necessary vibrations of both ends, as shown in red lines, Fig. 1, Sheet 2, while at the same time the teeth are prevented from turning over laterally.

In raking by horse-power one objection has heretofore been experienced in the use of wire teeth—viz., the scratching up of the dry bottom, sticks, and other foreign matter. By the construction of my rake the teeth have a slight spring or vibration before the extended ends come into full action, whereby the lower points of the teeth can rise to pass over refuse matter, but are held down by the extended ends *b*, to insure the proper and clean gathering of the hay.

From the foregoing description it will be seen that I have produced a horse-rake with wire or metal teeth without the spring-coil, which have all, or nearly all, the advantages of the coiled spring-toothed rake. After the driver has thrown bar J into the ratchet-wheels C C, which he can do by pushing lever M forward, either with his foot or hand, the operation thereafter of elevating and dropping the teeth is automatic, since as bar J and the front of the frame D are carried down by the action of the ratchet-wheels the fingers *n n*, fastened to the rear of bar J, come in contact with the curved arms or projections *o o*, fastened to the lower side of the stationary axle A, and are forced out sufficiently to move bar J out of the ratchet-teeth, when the rear elevated part of frame D, together with the teeth H, fall back to the proper position for renewing the raking operation. The fingers *n n* and arms *o o* are so arranged as to permit the teeth to raise a sufficient distance to pass the raked hay before bar J is forced out of the ratchet-teeth to drop the rear end of frame D.

In operating lever M by a rope or cord, *i*, to throw bar J into the ratchet-teeth, the rope should be passed forward and around a pulley attached to brace Q, or a cross-piece attached to the shafts, and then passed back in rear of the rake, so that as the attendant pulled the rope while walking behind the rake, lever M would be drawn forward or toward the team. It relieves the driver very much by having the mechanism for elevating the teeth to discharge the hay therefrom act automatically, as above described, after it has been once thrown into action.

Having described my improved horse hay-rake, what I claim therein as new and of my invention, and desire to have secured by Letters Patent, is—

1. The combination, with the free extended ends of the rake-teeth, of guides which allow the extended ends to rise and fall and also to move longitudinally, but prevent them from moving laterally, for the purposes stated.

2. The combination, in a horse hay-rake, of curved metal teeth with their support or fulcrum-bar in such a manner that neither end of the teeth shall be connected to any part of the frame, for the purposes stated.

3. The combination, in a horse hay-rake, of metal teeth with their main supporting or draft bearings in such a manner that their upper or forward ends shall extend forward of the draft-bearings or fulcrum-connections, and serve as springs to keep the lower ends of the teeth down in proper positions for raking and gathering the hay, substantially as stated.

4. The combination, for the purposes stated, in a horse hay-rake, of the following elements—viz., first, a rocking frame for elevating and depressing the teeth to discharge the hay; second, a series of metal teeth without coils, having single draft connections or attachments in rear of the forward ends of the teeth; third, a series of bearings for the free ends of the teeth forward of their draft-connections, which admit of an up, down, and longitudinal movement of the extended ends of the teeth during the operation of raking.

5. A rocking frame in a horse hay-rake having the rear end pieces turned up for supporting the piece which elevates the teeth to discharge the hay, in such a manner as to give proper room below it for the accumulating hay to form a windrow, while at the same time preventing the hay from working forward upon the teeth.

6. The combination, with the raking-frame and ratchet-wheels C C, of the cams or eccentric wheels or rings K K, straps or clasps *e e*, bar J, shaft L, and lever M, substantially as and for the purposes set forth.

7. The combination of the sliding bar J with one or both of the ratchet-wheels, substantially as and for the purposes set forth, 8. The combination, with bar J and axle A, of the fingers *n n* and arms *o o*, substantially as and for the purposes set forth.

DAVIS B. WOODWARD.

Witnesses:
JAS. H. NAYLOR,
HENRY DAVIS.